United States Patent Office 3,794,478
Patented Feb. 26, 1974

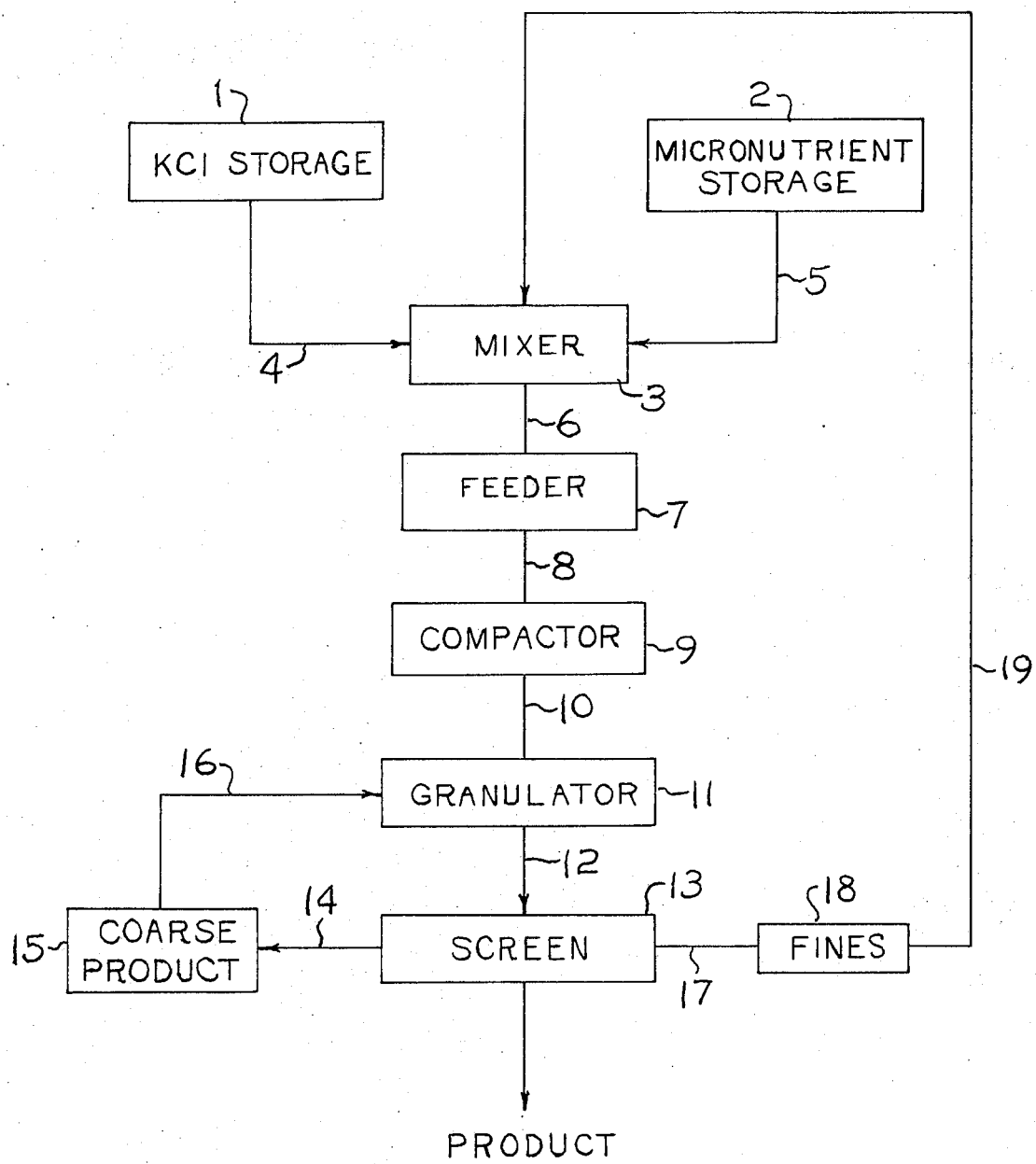

3,794,478
FERTILIZER COMPOSITION CONTAINING MICRONUTRIENTS
Alvin J. Dirksen, De Kalb, Ill., assignor to Kalium Chemicals Limited, Regina, Saskatchewan, Canada
Continuation-in-part of application Ser. No. 177,294, Sept. 2, 1971, which is a continuation-in-part of application Ser. No. 765,761, Oct. 8, 1968, both now abandoned. This application Sept. 29, 1972, Ser. No. 293,722
Int. Cl. C05d 9/02
U.S. Cl. 71—1   17 Claims

ABSTRACT OF THE DISCLOSURE

A novel phosphate-free granular potassium chloride (KCl) fertilizer composition is described in which the KCl has embedded within it predetermined amounts of micronutrient values. Optionally, macronutrients, e.g., secondary nutrient values and/or a source of the primary nutrient nitrogen, e.g., nitrogen-containing compounds are also embedded in the KCl. The novel KCl composition (other than for the absence of phosphorus) provides a balanced plant nutrient composition in that substantially each KCl granule is a balanced plant nutrient containing predetermined amounts of selected nutrients. Incorporation of the various nutrients in KCl is accomplished by compacting KCl and the added selected nutrients at pressures sufficient to cause plastic flow in the KCl while the KCl is in intimate contact with the added source of the selected nutrients. Typically pressures of 8,000 to 30,000 pounds per linear inch are used. Specific micronutrients exemplary of those incorporated in the KCl are the elements boron, manganese, copper, iron, zinc, molybdenum and cobalt. KCl compositions disclosed contain at least 0.05 percent by weight of the desired micronutrients. The quantity of micronutrient compound incorporated in the KCl varies considerably and depends upon soil and crop demand. Quantities of micronutrient incorporated can vary from 0.05 to 50, e.g., 0.1 to 30, weight percent based on KCl, disclosed include calcium, magnesium and sulfur.

CROSS REFERENCE TO RELATED APPLICATIONS

This application is a continuation-in-part of my copending application Ser. No. 177,294, filed Sept. 2, 1971 which, in turn, is a continuation-in-part application of my application Ser. No. 765,761, filed Oct. 8, 1968. Both applications are now abandoned.

DESCRIPTION OF THE INVENTION

The need to add micronutrients to the soil has been recognized by agricultural research experts for some time. Micronutrient deficiencies exist in many solids in many countries of the world including the United States. These deficiencies vary in kind and amount in different locations. It has also been recognized that deficiencies in specific micronutrient values in the soil vary depending upon the particular crop grown. A survey of micronutrient deficiencies in the United States has been reported for example in Agricultural and Food Chemistry, vol. 10, No. 3, May-June 1962 at pp. 178–181 and relates specific micronutrient deficiencies to specific crops. As can be readily appreciated, the agricultural community is vitally interested in the application of needed micronutrient values to a given soil in a controlled and competent manner so that maximum crop production can be achieved in that soil.

Heretofore micronutrient values have been added to the soil by mixing the requisite amount of micronutrient source compounds, e.g., the oxides, sulfates, chlorides, nitrates and the like of the micronutrient elements with a major fertilizer component (macronutrient) such as KCl and applying a dry blended bulk mixture of KCl and the micronutrient, or micronutrients if more than one was to be added, directly to soil. As will be readily appreciated, this system suffers from the disadvantage of applying materials of differing densities, sizes and shape from a bin or tank where segregation of particles is commonplace. This method resulted often in a non-homogeneous application of the components of the mixture to the soil. It is particularly important to avoid segregation of the micronutrients since the resultant non-uniform application to crops could result in failure to correct the deficiency, where less than the desired amount is applied, and poor yields or even toxicity at places where the application is excessive. The lack of any micronutrient, or too much, can produce a distinct and often dramatic visible difference from normal. This may show as a variation in growth, color, root development, flower and seed formation, and ultimate yield and quality. Further, this method has significant short-comings from an agronomic standpoint. The proportions of micronutrient added usually are so small (often 5% or less) that only a small number of micronutrient granules would be added. In common bulk-spreading operations, distances between micronutrient granules on the field would likely be excessive. Similar problems are encountered in attempting to add secondary macronutrients such as calcium, magnesium and sulfur to the soil in admixture with the primary macronutrients, i.e., potassium, phosphorus and nitrogen.

In some instances KCl fertilizer compositions have been prepared containing magnesium and calcium compounds by depositing such compounds on the surface of the KCl granules from solutions and drying, shaping and hardening the final product in rotary drums. Exemplary of this type of system is the process described in U.S. Pat. 2,107,702. Products of this type are often non-uniform in size due to abrasion of the particles during handling and storage. Moreover, abrasion of the coated KCl particle removes the nutrient coating from the surface and causes segregation of these nutrient values. Such segregation results in the same difficulties and problems associated with bulk blending.

Another method for incorporating micronutrients into a macronutrient composition is to add compounds of the micrnutrient(s) to clear liquid mixed fertilizers. The main difficulty associated with this method is the solubility of the micronutrient compound. For example, compounds of zinc, copper, iron and manganese are almost insoluble in ammonium orthophosphate solution. When a solution of zinc sulfate is added to an ammonium orthophosphate solution, zinc is precipitated as zinc ammonium phosphate $(ZnNH_4PO_4)$. Similar precipitates are formed when salts of manganese, iron and copper are added to an ammonium orthophosphate solution. While chelates have allowed the attainment of reasonably adequate levels of certain micronutrients, these materials are comparatively expensive.

Incorporating micronutrient materials into granular fertilizers oftentimes adversely affects granulation. For example, Thomas slag, which is a Bessemer basic slag and a by-product of the steel industry is used as a source of nutrient phosphorus. The slag also contains compounds of iron, calcium, sulfur, magnesium and other elements found in the iron ore from which the steel is made. Attempts to produce granules of Thomas slag alone by compaction have not succeeded. In French Pat. 1,434,584, potassium salts are described as binders for Thomas slag, thereby permitting the formation of the slag in granular form. The use of 10 to 50 weight percent of potassium salt with 90 to 50 weight percent of Thomas slag is described.

The method described in French Pat. 1,434,584 comprises mixing Thomas slag with a potassium salt, compressing the mixture between the cylinders of a rolling mill and subsequently crushing the resulting plates in an impact breaker. While this method provides a mixture of some micronutrients and secondary macronutrients with a potassium salt, the composition of Thomas slag is relatively fixed, thus limiting the flexibility of the fertilizer composition that can be made with it. Further, some of the components of the slag may be contraindicated for use in certain soils or for use with specific crops thus rendering the compositions provided by the French patent useless in some areas with certain crops. Still further, some of the micronutrient values in the slag will be rendered unavailable to the plant root system because of the formation of insoluble phosphates, as described herein.

In accordance with the present invention, novel phosphate-free KCl products are prepared which contain one or more micronutrients in such a form that dissolution of the KCl can readily occur unimpaired while the incorporated micronutrients contained therein are thereby made available in the soil to provide micronutrient value to the soil and the plant root system. Such KCl compositions containing the primary nutrient nitrogen and/or secondary nutrients are also contemplated. All nutrient values incorporated into KCl particles in accordance with the present invention are embedded in the KCl as discrete particles of the particular nutrient compound employed and are substantially homogeneously distributed throughout the KCl particles. Thus, removal of the micronutrients from the KCl by abrasion during storage, handling and application is greatly minimized or eliminated.

BRIEF DESCRIPTION OF THE DRAWING

The accompanying drawing is an abbreviated schematic flow diagram of a process for preparing the compositions of the present invention.

DETAILED DESCRIPTION

In the preparation of the novel products of the instant invention, KCl particles of a size usually less than 14 mesh (Tyler Standard Sieve Size), typically from 14 to 325 mesh, and preferably in a size range of from 14 to 100 mesh are mixed with particles of the compounds containing the desired nutrient element values to be incorporated in the final product. Preferably, the KCl particles and micronutrient containing compounds are in the dry state. Normally, the desired nutrients containing compounds mixed with the KCl are in a size range of less than 20 mesh (Tyler Standard Sieve Size), typically 50 to 325 mesh. Preferably such compounds are in the size range of 65 to 200 mesh.

After blending the KCl particles and added nutrient compound in the desired quantities, the mixture is fed between compaction rolls at pressures of from 8,000 to 30,000 pounds per linear inch of roll width to form a sheet of KCl having the nutrient compound(s) dispersed therein as discrete particles. Where presses and other similar equipment designed to compact over a large surface area are employed, pressures typically applied range between 10,000 and 70,000 pounds per square inch or more. The finished sheet of KCl containing discrete nutrient compound particles dispersed throughout is then crushed and screened to provide the desired size of the final product. The final product typically has a size range of from 6 to 20 mesh, preferably 6 to 14 mesh (Tyler Standard Sieve Size). It has been found that KCl containing desired nutrient values dispersed throughout in uniform quantities can be prepared in this manner. The product is especially resistant to degradation in that the added nutrient values are not removed from the KCl particles during handling and application. Thus, unlike bulk blending techniques of the prior art, which result in segregation of the added micronutrients from the macronutrient with which they are blended, the instant invention provides KCl composition which is substantially resistant to stratification during storage and handling.

As utilized herein in the specification and claims, the term "nutrient" is intended to mean those elements that are required by plants for proper and healthy growth. The term "macronutrient" is intended to mean those nutrients that make up the major components of granular fertilizers and include those elements generally classified by the trade as "primary" and "secondary" nutrients. As commonly used, the term "primary nutrient" includes the elements phosphorus, nitrogen and potassium taken singly or in any combination. The term "secondary nutrient" includes the elements magnesium, calcium and sulfur taken singly or in any combination. The term "micronutrient" includes the elements other than the primary and secondary nutrients. Typical of the micronutrients contemplated by the instant invention for incorporation in KCl include among others, boron, copper, iron, manganese, molybdenum, cobalt and zinc. Primary nutrients, secondary nutrients and micronutrients are commonly supplied as oxides or salts of the respective elements.

Micronutrients can be supplied to the soil in various forms, commonly they are supplied as oxides of the various micronutrient elements or salts thereof, such as the sulfates, nitrates, chlorides and the like. Micronutrient can also be supplied as anionic radicals. For example, molybdenum can be applied to the soil in the form of sodium molybdate. They can also be added in other forms. Thus, iron can be applied in the form of iron chelates or other complex compounds in which the coordinated metal ion is anionic, cationic or neutral. The important consideration in applying micronutrients to the soil is that they be appropriately selected for use with a particular soil or class of crops and that they be provided in a form suitable for ultimate dissolution upon the application of water to the soil containing the micronutrient salt, oxide etc. in order that the desired micronutrient element can be delivered to the soil and made readily accessible o the plant root system growing therein.

Examples of commonly used materials for the supply of micronutrient elements include: borax, sodium pentaborate and tetraborate, boric acid, colemanite

$(Ca_2B_6O_{11}SH_2O)$ boron frits, copper sulfate, malachite $(CuCO_3Cu(OH)_2)$, cuprous oxide, cupric oxide, chalcopyrite $(CuFeS_2)$, chalcocite $(Cu_2S)$, copper acetate, ferrous sulfate, ferric sulfate, ferrous and ferric oxide, iron frits, iron methoxyphenylpropane, manganese sulfate, manganous oxide, manganese methoxyphenylpropane, manganese carbonate, manganese chelate, manganese chloride, mangenese oxide, manganese frits, sodium molybdate, ammonium molybdate, molybdenum trioxide, molybdenum sulfide, molybdenum frits, cobaltous nitrate, cobaltous sulfate, zinc sulfate, zinc oxide, zinc carbonate, zinc sulfide, zinc frits, and zinc chelates. The particular micronutrient source compound chosen will depend on the soil to which it is applied and the crop to be fertilized, and will be that compound which presents the micronutrient in a form such that it is available in the soil to the root system to provide micronutrient value.

Micronutrients required by a particular soil will vary depending upon the geographical location and the particular crop to be grown. In carrying out the present invention, the quantity and type of nutrient to be added to the KCl is predetermined and based on the deficiency of the soil, which in turn is regulated by the particular crop to be grown in the soil. Thus, in the practice of the present invention the quantity of micronutrient mixed with the KCl is regulated to provide the requisite quantity of micronutrient for a given soil and crop. One or more secondary nutrients can be incorporated in the KCl in the same fashion as the micronutrients herein disclosed. Similarly the primary nutrient nitrogen can be incorporated in the KCl in the same fashion. Thus, the general principles discussed with respect to the incorporation of micronutrients in KCl apply equally to the aforementioned primary and secondary nutrients.

When micronutrient sources are incorporated in macronutrient carriers undesirable chemical interactions can occur during formulation, in storage, or during the initial dissolution stage in the soil. These undesirable reactions implicate water in some manner, either as an essential reagent or as the mutual solvent for interacting compounds. In solid macronutrient carriers, the free moisture content of the air has a marked influence on the nature of the chemical reactions that take place, as well as on rates of reaction. Such reactions alter the chemical and solid state form of the micronutrient, with corresponding changes in its physical and chemical behavior in the soil.

One adverse chemical reaction that can occur is the formation of insoluble phosphates. Thus when micronutrients are in contact with a phosphate fertilizer, particularly ammonium orthophosphate they can form insoluble phosphates thereby making unavailable to the plant root system the micronutrients added to the soil. These reactions are referred to as metathetical reactions and are those in which added micronutrient compounds and fertilizer salts recombine as stable (reciprocal) salt pairs. Generally, the reaction proceeds in an irreversible manner to near completion, as illustrated by the examples,

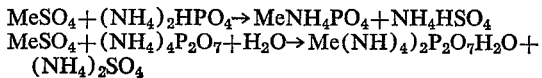

wherein Me is the micronutrient metal, e.g., $Cu^{2+}$, $Fe^{2+}$, $Mn^{2+}$ and $Zn^{2+}$, recombines into compounds of much lower solubility than the original compounds.

Thus, incorporation of manganese sulfate at a level of 10% Mn in granular ammonium pyrophosphate or $(NH_4)_3HP_2O_7$ has significantly reduced forage yields and uptake of phosphorus by corn grown in the greenhouse. Chemical extraction of the fertilizers revealed that solubility of both manganese and phosphorus was reduced when these materials were combined. A compound of very low solubility, $Mn(NH_4)_2P_2O_7 2H_2O$ was identified as the principal reaction product.

A discussion of the aforementioned metathetical reactions and testing is found in the text, Micronutrients in Agriculture, by J. J. Mortvedt, chairman, Soil Science Society of America, Inc., Madison, Wis. (1972). Reference is made specifically to pp. 462–463 and 508–509 of the aforementioned text.

French Pat. 1,434,584 describes the use of from 10 to 50 weight percent potassium salts as binders for Thomas slag in order to produce the slag in granular form. Thomas slag is Bessemer basic slag and is a by-product of the steel industry. It is extensively manufactured in Europe and is a chief source of phosphoric acid.

Thomas slag is a hard, massive, black cinder and is useless as a fertilizer until ground to a very fine powder. Because of the difficulties associated with the handling, packaging and shipment of the fine powder, it was found advantageous to granulate the powder. The slag, however, does not compact easily and the process of the aforementioned French patent describes a method for achieving granular Thomas lag.

Analysis of the chemical composition of a typical basic slag has been reported in Fertilizer Technology and Resources in the United States, K. D. Jacob editor, p. 339, Academic Press, Inc., New York, N.Y., 1953. The analysis (weight percent), reported as oxides, is as follows: $P_2O_5$—11.01, $SiO_2$—10.16, CaO—42.60, MgO—6.15, MnO—3.78, $Fe_3O_4$—24.00, $Al_2O_3$—0.45, $TiO_2$—0.17, $K_2O$—0.14, $Na_2O$—0.06, S—0.09, Zn, Cu, B—trace. Another more brief analysis for Thomas slag appears on p. 178 of Commercial Fertilizers, by Gilbeart H. Collings, The Blakiston Co., Philadelphia, Pa., 4th, ed., 1949.

Since Thomas slag is a source of nutrient phosphorous, it is likely that micronutrients present therein are present as insoluble phosphates in either single or double salts. Further, basic slag is not used in mixed fertilizers because its high lime content is of such a nature that chemical introduction of mixtures with ammonium salts may bring about a liberation of ammonia. Thus, Thomas slag is most likely not a suitable and readily available source of micronutrients for plants. Further, its composition is fixed thereby limiting its applicability. Moreover, the use of some of its elements may be contraindicated in a particular soil or for certain crops.

The compositions of the present invention are phosphate-free KCl compositions containing micronutrient(s) or micronutrient source compounds. Such compositions are not subject to the problems presented by the use of Thomas slag. By phosphate-free is meant that the KCl composition contains substantially no phosphate radicals or compounds which radicals or compounds are capable of combining with micronutrient(s) by metathetical reactions.

For a more complete understanding of the present invention, reference is made to the accompanying flow diagram which indicates in general the method employed for preparing the novel KCl compositions of the instant invention.

As shown in the drawing, KCl is stored in a storage bin 1 and the desired micronutrient(s) in storage bin 2. Storage bin 2 can be a single or multicompartment bin for the introduction of one or several micronutrients. By proper use and placement of valves, different amounts of each source of micronutrient can be added to the KCl in the amounts required. KCl is fed to a mixer 3 via line 4 and micronutrient(s) are admitted to the mixer 3 via line 5. The quantities of KCl and micronutrient fed are controlled to provide the specific mixture desired. Mixer 3 may be any suitable mixer. The KCl and micronutrient are retained in the mixer until they are sufficiently dispersed within each other to provide as near as possible a homogeneous mixture of the two materials. The mixture from mixer 3 is then fed via line 6 to a feeder 7 and from feeder 7 via line 8 to a compactor 9, which typically takes the form of compacting rolls. Other equipment such as briqueting, pelletizing or extrusion equipment can also be used. The KCl-micronutrient mixture is passed between the compacting rolls at high pressure. The pressure must be sufficient to deform the KCl crystals plastically during compacting and produce plastic flow of the KCl. The deformed KCl forms a sheet of KCl as it emerges from the rolls and the sheet so formed is passed via line 10 to granulator 11. In granulator 11, the sheet is broken up into particles which are then passed via line 12 to a screening operation 13. In the screening operation, product typically having a mesh size of from 6 to 20, preferably 6 to 14, mesh (Tyler Standard Sieve Size) is produced. Fractions coarser than the range desired for the finished product are passed via line 14 to an oversize (coarse) product storage bin 15 and are recycled either continuously or periodically via line 16 to the granulation step to provide further quantities of product. If desired, oversize product can be recycled to line 16 as it is collected thus eliminating storage bin 15. Fines are removed from the screening operation via line 17 and are passed to a fines storage bin 18 where they are recycled via line 19 to the mixing step for incorporation with further quantities of KCl and micronutrients. If desired, fines can be recycled directly to line 19 as collected thus eliminating storage bin 18. As can be readily seen, the process depicted provides an efficient method for the utilization of micronutrient and KCl values passing through the system.

It is preferred in the preparation of the fertilizer compositions of the instant invention that the KCl and micronutrient values fed to the system be in a substantially dry state. Thus, both KCl and micronutrient compounds employed typically have less than 1 percent by weight free water present in them. The mixture fed to the compacting rolls typically has less than 1 percent by weight water. While it is preferred to operate so that the KCl and micronutrient feeds are dry, that is, containing less than 1 percent by weight free water, it is possible to feed KCl and micronutrient containing some water to the system and produce a satisfactory product. Thus, quantities of free water ranging from 0.1 to 10 percent by weight can be present in the mixed feed that is passed to the compacting rolls. However, that embodiment is less desirable than feeding dry material.

Generally when applying pressure to the KCl-micronutrient(s) mixture undergoing compaction, it is desirable to impart to this material pressures in the range of from 8,000 to 30,000 pounds per linear inch of roll width. It is of course permissible to utilize higher pressure if desired; however, such pressures are not considered necessary. Pressures below 8,000 pounds per linear inch of roll width do not generally produce a sufficiently dense product.

The granulating operation can be conducted conveniently utilizing granulating rolls which can take any of various forms conventional in the art and represent no particular innovation. Thus, granulating rolls such as those described in U.S. Pat. 3,135,473 can be employed to produce a granulated product from the sheet of KCl-micronutrient material formed in the compacting step. It is preferable to employ granulating rolls in the fashion described in the aforesaid U.S. patent so that the sheet material is chewed into pieces. If desired, impact mills or friction grinding equipment can be used. The material passing through the granulator is screened to provide a product of desired particle size. Larger particles than the desired size are recycled to the granulating step to produce further quantities of product in the desired size range. Fines, that is, material smaller than 20 mesh in size, are delivered to the mixing vessel 3 so that they can be incorporated in admixture with further quantities of KCl and micronutrient(s) to form further quantities of product for feed to the compacting step for the production of KCl sheet containing micronutrient values.

Any conventional dry mixing equipment can be employed for the mixing of KCl with micronutrient source compounds. Thus, rotating pan mixers, double motion paddle mixers, ribbon blenders and other similar equipment designed to adequately mix dry materials of different densities can be utilized. A particularly effective mixer is a double cone mixer of the type described on p. 1212 of Perry's Chemical Engineers' Handbook, 3rd ed.

In conducting the compacting step in accordance with the instant invention, the compacting rolls employed commonly are those which are smooth-faced, shaft-mounted rolls that are driven through a single gear reducer. The material typically is fed to the rolls from a feeder located above the rolls and designed to pass the material between the rolls for subjection to high pressures. Typically, one of the rolls is supported on stationary bearings while the other is provided with means for applying hydraulic pressure through its bearings.

The sheets of KCl produced by the instant process are dense, compacted sheets of KCl of considerable thickness. Thus, for example, a typical sheet of KCl produced by the instant process will have a thickness of between ⅛ (one-eighth) to ½ (one-half) inch. The thickness of the material can be controlled by regulating the rate of feed of material fed to the roll through a pressurized feeder, the pressure applied and the particle size of the feed, and other similar considerations. It is an important consideration to provide a sufficient feed to the roll so that a constantly uniform sheet is prepared. Thus, material is fed to the rolls to provide a constant head of material on the rolls at all times to insure uniform dimensions in terms of thickness for the sheet of KCl produced.

The sheet of KCl produced in accordance with the instant method can have differing amounts of micronutrient(s) present therein. The amount of micronutrient(s) present in the KCl is determined in the mixing vessel 3 where the KCl is dry mixed with the micronutrient value(s) to be incorporated therein. This value will differ depending upon the particular use to which the KCl-micronutrient fertilizer composition is to be put. Thus, in accordance with the instant invention, a product of any desired concentration of micronutrient and KCl, both in terms of the quantity of micronutrient(s) and the specific type of micronutrient can be produced so long as the micronutrient content does not exceed a value at which a dense cake or sheet of KCl-micronutrient can be produced. In other words, sufficient KCl to produce a competent cake of KCl-micronutrient values must be present. Thus, the method of the instant invention and the products produced provide considerable flexibility in providing KCl fertilizer having any particular micronutrient and quantity of micronutrient for any desired application.

During compaction of the KCl-micronutrient mixture, the KCl is deformed plastically due to the high pressure imparted to it. The deformed KCl envelopes the micronutrient values present as salts, oxides, etc. mixed with it and the micronutrient and KCl become a unitary mass passing between and out through the rolls with the micronutrient values being present as discrete particles. As the KCl-micronutrient containing plastic material issues from the rolls, it is in the form of a dense sheet. The micronutrients are bound firmly to the KCl and dispersed substantially homogeneously throughout as discrete particles. Typically, the micronutrient(s) form a minor constituent of the finished KCl sheet. The micronutrient content of KCl fertilizer prepared by the instant method (calculated on the amount of micronutrient source compound incorporated into the KCl) can vary from about 0.05 to about 50 percent by weight; however, typically the micronutrient compound is present in a minor amount and the KCl is present in a major amount, i.e., greater than 50 percent by weight. Generally, the micronutrient compounds are present in the KCl sheet in the range of from about 0.1 to about 30 percent by weight, preferably from about 0.1 to about 10 percent by weight. During the granulation step the KCl is broken into pieces. The discrete particles of micronutrient are solidly attached to the KCl even in those instances where they are exposed on the surface of a particle. In effect, the micronutrient particles are fused to the KCl particle with which they are associated since they were intimately in contact with that KCl as it was deformed into a solid sheet.

EXAMPLE I

A magnesium containing KCl fertilizer compostion is prepared by dry mixing 19 grams of KCl having a particle size range of 65 to 100 mesh (Tyler Standard Sieve Size) with 19 grams of magnesium sulfate having a particle size range of 65 to 325 mesh (Tyler Standard Sieve Size) in a 100-milliliter beaker. The mixture is charged to a compacting press and subjected to a pressure of 70,000 pounds per square inch for 1 minute to produce a dense disc of KCl containing KCl and magnesium sulfate. The disc of KCl-magnesium sulfate is granulated by hand grinding in a mortar and the particles are screened to provide KCl-magnesium sulfate product in a size range of 6 to 20 mesh (Tyler Standard Sieve Size).

EXAMPLE II

A fertilizer composition of KCl and sodium molybdate is prepred by dry mixing 31 grams of KCl having a particle size range of from 65 to 100 mesh (Tyler Standard Sieve Size) with 3 grams of sodium molybdate in a 100-milliliter beaker. The mixture in the beaker is fed to a compacting press in which it is subjected to a pressure of 70,000 pounds per square inch 1 minute to thereby form a solid disc of KCl containing sodium molybdate. The resulting disc is hand ground in a mortar and screened to provide product KCl-sodium molybdate particles in the range of 6 to 20 mesh (Tyler Standard Sieve Size).

EXAMPLE III

A KCl-micronutrient composition is prepared by mixing 74 pounds of 65 to 100 mesh KCl with 19 pounds of 65 to 325 mesh (Tyler Standard Sieve Size) copper oxide in a ribbon blender for a period of 10 minutes. The discharge from the ribbon blender is fed to a feed hopper located above compacting rolls and is fed continuously between the rolls. The material passing between the rolls is subjected by the rolls to a pressure of 20,000 pounds per linear inch of roll width. A dense sheet of KCl containing copper oxide is produced. The sheet is then subjected to granulation and is screened to provide a product between 6 to 20 mesh in size (Tyler Standard Sieve Size).

EXAMPLE IV

A KCl-containing fertilizer composition is prepared by mixing 128 pounds of KCl with 1.2 pounds of ferrous sulfate in a ribbon mixer for a period of 10 minutes. The discharge from the ribbon mixer is fed to a feed hopper located above compacting rolls and the mixture is fed continuously between these rolls. The rolls apply a pressure of 20,000 pounds per linear inch to the dry material passing between the surfaces of the rolls and produces a sheet of KCl containing iron sulfate. The sheet is found to contain ferrous sulfate in a weight percent essentially equivaent to the weight percent of iron sulfate in the mixture in the feed hopper. The dense sheet of material is then subjected to granulation between rolls, screened, and the fraction between 6 to 20 mesh (Tyler Standard Sieve Size) retained as product.

EXAMPLE V

A fertilizer composition is prepared by mixing 29 grams of KCl with 6 grams of copper sulfate and 4 grams of zinc sulfate in a 100 milliliter glass beaker. The mixture is fed to a compacting press and is subjected to a pressure of 70,000 pounds per square inch for 1 minute to thereby form a circular disc of KCl containing copper and zinc sulfate embedded therein. The sheet of KCl containing copper and zinc sulfate is then subjected to hand grinding in a mortar and the ground particles are screened to provide particles of KCl containing zinc and copper sulfate in a size range of 6 to 20 mesh (Tyler Standard Sieve Size).

EXAMPLE VI

A fertilizer composition containing micronutrients and secondary nutrients is prepared by dry mixing 22 grams of KCl with 2 grams of copper chloride and 10 grams of calcium chloride in a 100 milliliter glass beaker. The mixture from the beaker is fed to a compacting press and subjected therein to a pressure of 70,000 pounds per square inch for 1 minute. A sheet of KCl containing copper chloride and calcium chloride is produced. The sheet so produced is subjected to hand grinding and is screened to provide a product of KCl particles containing copper chloride and calcium chloride, the particles having a size range of 6 to 20 mesh (Tyler Standard Sieve Size).

EXAMPLE VII

A manganese-containing KCl fertilizer composition is prepared by mixing in a 100 milliliter beaker 3 grams of manganese sulfate monohydrated with 31 grams of KCl, all particles being in the 95 to 100 mesh range (Tyler Standard Sieve Size). The mixture in the beaker is then fed to a compacting press and is subjected to a pressure of 70,000 pounds per square inch for 1 minute to thereby form a solid disc of KCl containing manganese sulfate. The resulting disc is then hand ground in a mortar and screened to provide product KCl-manganese sulfate particles in the range of 6 to 20 mesh (Tyler Standard Sieve Size).

Also within the contemplation of this invention is the utilization of KCl-micronutrient compositions and KCl-secondary nutrient compositions as components of bulk mixtures of these novel compositions with primary macronutrients. Thus KCl having embedded in it micronutrient(s) and/or secondary nutrients can be blended with primary fertilizer macronutrients such as phosphorus and/or nitrogen compounds to provide a suitable bulk-blend of all necessary plant nutrients. Care should be exercised in the use of a bulk blend of a phosphate macronutrient and the KCl-micronutrient composition because of the problem of metal ion exchange referred to earlier. The formation of insoluble micronutrient phosphates is not a significant factor in the bulk blend because the micronutrient is contained within the KCl particle and because of the relatively short contact time involved, assuming that the blend is applied to the soil within a reasonable time after the blend is produced. Spreading of the blend on the soil should provide sufficient spacing between the phosphate and KCl-micronutrient particles to minimize significant formation of insoluble micronutrient phosphates.

For a more complete understanding of this aspect of the invention the following example demonstrates the usefulness of the KCl compositions in bulk blending fertilizer compositions containing all major nutrients.

EXAMPLE VIII 57.5 pounds of KCl particles prepared in the manner described in Example III and containing 2 percent by weight zinc micronutrient as ZnO is blended in a dry mixer with 23.6 pounds of ammonium sulfate and 12.3 pounds of dibasic potassium phosphate to provide a fertilizer equivalent to a commercial grade fertilizer having 40 percent by weight potassium as $K_2O$, 5 percent by weight phosphorus as $P_2O_5$ and 5 percent by weight nitrogen. The finished fertilizer composition has a zinc micronutrient content of 1.2 percent by weight.

In blending KCl-micronutrient compositions of the instant invention with primary nutrients, including KCl, it is contemplated using KCl-micronutrient compositions having a relatively high weight percentage of micronutrient so that upon subsequent blending of the composition with further primary nutrients, the micronutrient level in the total blend is within the desired range for application. Thus, the invention contemplates the use of KCl-micronutrient compositions that can be applied directly to the soil for plant nutrition as well as compositions that can be blended with other primary and/or secondary nutrients for application to the soil.

In the above examples, fertilizer compositions are shown which have particular utility with respect to certain soils and/or crops. Other compositions can be prepared using the instant invention to satisfy the requirements of other soils and crops. Thus, the fertilizer composition of Example II is useful in areas of molybdenum deficiency such as Florida, West Virginia, Delaware, Georgia, North Carolina, South Carolina, Virginia, Louisiana, Mississippi, Arkansas, Kansas, California, Washington, Minnesota and Indiana. It is particularly applicable to crops such as alfalfa, soy beans, legume, cauliflower and peas.

The copper containing KCl fertilizers of Examples III, V and VI are useful with corn, barley, wheat, soy beans, sugar cane and citrus fruits and in the soils of California, Oregon, Minnesota, Florida, Massachusetts, Indiana, Michigan and North Carolina.

Iron containing KCl, such as produced in Example IV, is useful on product crops such as sorghum, soy beans, corn, tomatoes, fruit, legume, pecans and grass and is typically required in soils in California, Oregon, Nevada, Arizona, Colorado, New Mexico, Kansas, Nebraska, South Dakota, Minnesota, Texas and Florida.

The micronutrient containing fertilizer of Example VII is useful on fruits, nuts, soy beans, cotton, beans, sweet potatoes, peanuts, oats, corn and beans and typically is useful in supplying deficiencies in the soils of Florida, Georgia, South Carolina, North Carolina, Virginia, West Virginia, Delaware, Ohio, Indiana, Illinois, Iowa, Wisconsin, Utah, California and Oregon.

Zinc containing KCl such as produced in Example VIII finds utlity with crops such as corn, sorghum, potatoes, cherries, apples, peaches, pecans, citrus fruits, and cotton and in soils such as those found in Oregon, Washington, Texas, New Mexico, Arizona, Utah, Colorado, Oklahoma, Nebraska, North Dakota, Louisiana, Mississippi, Alabama, Georgia, South Carolina, North Carolina, Maryland, Delaware, Minnesota and Montana.

While the invention has been described with reference to certain specific examples and illustrated embodiments, it is of course to be understood that the invention is not to be limited thereby. For example, the quantity of micronutrient to be employed in a given KCl product can be varied considerably and will depend entirely upon the quantity of micronutrient required by the soil and the particular crop to be grown in that soil. Thus, while certain percentages of specific micronutrients are described in the examples, it will be obvious to the skilled artisan that the micronutrient(s) can be varied as well as the quantity thereof. Generally, micronutrients are present in the composition of the instant invention in an amount of from at least 0.05 percent by weight of the KCl on the basis of the micronutrient compound added up to about 50 percent by weight. More typically, the compositions of the instant invention have micronutrient values ranging between 0.1 and 30 percent by weight, preferably from 0.1 to 10 percent by weight, the micronutrient compound employed based on KCl.

A limiting factor on the quantity of micronutrients and/or other major fertilizer macronutrients incorporated in the KCl is that they cannot be present in such large quantities that they prevent the KCl from becoming coherent and strong (competent) as the KCl emerges from the compacting operation. In general, the KCl component should represent between 50 and 99.5 percent by weight of the mixtures subjected to compaction. Similarly while the compacting zone of the preferred embodiment is a pressure roll, it will be readily understood that extrusion and pressure briquetting operations involving the plastic deformation of KCl are within the contemplation of the invention. In these instances a shaped solid, like the sheet from compacting roll, is produced though it is generally a different shape.

The products of the instant invention are typified by the fact that in their granular state, that is, after they have been formed ino a sheet and subjected to granulation, the KCl particles have intimately attached to or within them a nutrient value dispersed throughout as discrete particles of the particular nutrient and are phosphate free. As stated above, these nutrients have been attached to the KCl by a pressure deformation of the KCl during the compaction step. Thus, the nutrient value is either completely encased in the KCl or is physically attached to the KCl by depressing pockets in the KCl surface in a particularly advantageous manner so that it cannot be abraded from the surface of the KCl since it is intimately associated with the KCl by dispersion in the plastic matrix. Thus, when applied to the soil, the fertilizer compositions of the instant product will dissolve readily since KCl is so readily soluble in water and the micro-nutrient value, whether soluble or very nearly insoluble, will be exposed to the soil in a finely-divided form as the KCl dissolves.

While the invention has been described with reference to specific illustrated embodiments, it is of course to be understood that it is not to be limited except insofar as appears in the accompanying claims.

I claim:

1. A phosphate-free fertilizer granule consisting essentially of potassium chloride having dispersed throughout as discrete particles from 0.1 to 30 weight percent of micronutrient, said micronutrient being in a form such that it is available in the soil to provide micronutrient value.

2. A fertilizer granule according to claim 1 wherein the micronutrient is boron, copper, iron, manganese, molybdenum, zinc, cobalt or mixtures of such micronutrients.

3. A fertilizer granules according to claim 1 wherein the granule is substantially dry and the potassium chloride is in the size range from 6 to 20 Tyler mesh.

4. A fertilizer granule according to claim 1 wherein the micronutrient is supplied as a salt or oxide of the micronutrient.

5. A fertilizer granule according to claim 1 wherein the potassium chloride also has dispersed throughout as discrete particles nutrient values selected from the group consisting of primary nutrient nitrogen, values secondary nutrient values and mixtures of such nutrient values.

6. A phosphate-free fertilizer granule consisting essentially of potassium chloride having dispersed throughout as discrete particles from 0.1 to 10 weight percent of micronutrient selected from the group consisting of boron, copper, iron, manganese, molybdenum, zinc, cobalt, or mixtures of such micronutrients, said micronutrient being in a form such that it is available in the soil to provide micronutrient value.

7. A fertilizer granule according to claim 6 wherein the potassium chloride also has dispersed throughout as discrete particles nutrient values selected from the group consisting of primary nutrient nitrogen values, secondary nutrient values and mixtures of such nutrient values.

8. A phosphate-free fertilizer granule consisting essentially of potassium chloride having dispersed throughout from 0.05 to 50 weight percent of micronutrient selected from the group consisting of manganese, zinc and mixtures of such micronutrients, said micronutrient being in a form such that it is available in the soil to provide micronutrient value.

9. A fertilizer granule according to claim 8 wherein the micronutrient is present in an amount of from 0.1 to 30 weight percent.

10. A fertilizer granule according to claim 8 wherein the potassium chloride is in the size range of from 6 to 20 Tyler mesh.

11. A fertilizer granule according to claim 8 wherein the micronutrient is present as a salt or oxide of the micronutrient.

12. A phosphate-free fertilizer granule consisting essentially of potassium chloride having dispersed throughout as discrete particles from 0.1 to 30 weight percent of the salt or oxide of at least one micronutrient selected from the group consisting of boron, copper, molybdenum, zinc, cobalt and mixtures of such micronutrients, said micronutrient being in a form such that it is available in the soil to provide micronutrient value.

13. A fertilizer granule according to claim 12 wherein the potassium chloride also has dispersed throughout as discrete particles nutrient values selected from the group consisting of primary nutrient nitrogen values, secondary nutrient values and mixtures of such nutrient values.

14. A phosphate-free fertilizer granule consisting essentially of potassium chloride having dispersed throughout as discrete particles from 0.1 to 30 weight percent of the salt or oxide of at least one micronutrient selected from the group consisting of iron, manganese, and mixtures of such micronutrients, said micronutrient being in a form such that it is available in the soil to provide micronutrient value.

15. A dense sheet of phosphate-free, micronutrient-containing potassium chloride, said sheet consisting essentially of potassium chloride having dispersed throughout as discrete particles from 0.1 to 30 weight percent of micronutrient selected from the group consisting of boron, copper, iron, manganese, molybdenum, zinc, cobalt, and mixtures of such micronutrients, said micronutrient being in a form such that when said sheet is granulated and the granules applied to the soil, the micronutrient is available in the soil to provide micronutrient value.

16. A dense sheet according to claim 15 wherein the sheet is from one-eighth to one-half inch thick.

17. A dense sheet according to claim 15 wherein the micronutrient is present as a salt or oxide of the micronutrient.

References Cited

UNITED STATES PATENTS

| | | | |
|---|---|---|---|
| 3,560,192 | 2/1971 | Di Cicco | 71—1 |
| 3,135,473 | 6/1964 | Schrader et al. | 71—63 |
| 3,423,199 | 1/1969 | Philen et al. | 71—1 |
| 3,433,863 | 3/1969 | Bowden et al. | 264—140 |

FOREIGN PATENTS 1,434,584  2/1966  France.

CHARLES N. HART, Primary Examiner

U.S. Cl. X.R.

71—63, 64 DC